(12) United States Patent
Kim

(10) Patent No.: US 8,961,027 B1
(45) Date of Patent: Feb. 24, 2015

(54) HUB BEARING

(71) Applicant: Hyundai Mobis Co., Ltd., Seoul (KR)

(72) Inventor: Hee-Jung Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/498,970

(22) Filed: Sep. 26, 2014

(30) Foreign Application Priority Data

Nov. 4, 2013 (KR) .......................... 10-2013-0132834

(51) Int. Cl.
*F16C 33/58* (2006.01)
*B60B 27/00* (2006.01)

(52) U.S. Cl.
CPC ........... *B60B 27/0005* (2013.01); *F16C 33/586* (2013.01)
USPC ........................................................ 384/544

(58) Field of Classification Search
USPC ................................................ 384/544, 589
See application file for complete search history.

(56) References Cited

U.S. PATENT DOCUMENTS

| | | | | |
|---|---|---|---|---|
| 3,586,357 A | * | 6/1971 | Orain | 403/380 |
| 4,047,770 A | * | 9/1977 | Korenhof et al. | 384/482 |
| 4,493,388 A | * | 1/1985 | Welschof et al. | 384/544 |
| 4,893,960 A | * | 1/1990 | Beier et al. | 403/24 |
| 8,052,332 B2 | * | 11/2011 | Kamikawa et al. | 384/544 |
| 8,210,752 B2 | * | 7/2012 | Kamikawa et al. | 384/544 |
| 2004/0234182 A1 | * | 11/2004 | Tajima et al. | 384/544 |
| 2005/0163410 A1 | * | 7/2005 | Sakamoto | 384/544 |
| 2009/0096278 A1 | * | 4/2009 | Cermak | 301/111.03 |

FOREIGN PATENT DOCUMENTS

KR 10-2007-0113189 A 11/2007

* cited by examiner

*Primary Examiner* — Thomas R. Hannon
(74) *Attorney, Agent, or Firm* — Knobbe Martens Olson & Bear LLP

(57) ABSTRACT

A hub bearing may include a hub provided with a disc-shaped wheel coupling portion which is coupled to a wheel and a bearing mounting portion which passes through and protrudes from the wheel coupling portion, first face splines being formed on a protruding surface; and a bearing formed with a lower end fixed to the bearing mounting portion such that one side of the lower end comes into contact with the wheel coupling portion and an upper end fixed to a vehicle body, second face splines being formed on one surface of the lower end.

3 Claims, 3 Drawing Sheets

HUB BEARING

CROSS-REFERENCE(S) TO RELATED APPLICATIONS

This application claims priority to Korean Patent Application No. 10-2013-0132834, filed on Nov. 4, 2013, which is incorporated herein by reference in its entirety.

BACKGROUND

1. Field

The present disclosure relates to a hub bearing; and, particularly, to a hub bearing capable of preventing a slip between a bearing and a hub when a vehicle is rapidly accelerated after stopping.

2. Description of Related Art

Since torque is transferred from a differential gear to a drive shaft and then rotates drive wheels coupled to the drive shaft, driving force for forward or backward moving a vehicle is applied to the ground.

In this case, in order to couple the rotating drive wheels to a suspension system, a hub bearing which is fixable to the suspension system is mounted between the drive wheels and the drive shaft. Due to the hub bearing coupled to the suspension system, vertical vibration of the drive wheels is reduced by the suspension system regardless of rotation of the drive wheels.

SUMMARY

An embodiment of the present invention is directed to a hub bearing capable of preventing a slip between a bearing and a hub when a vehicle starts quickly after stopping by synchronizing both of the hub and the bearing forming the hub bearing with rotation of a drive shaft.

Other aspects and advantages of the present invention can be understood by the following description, and become apparent with reference to the embodiments of the present invention. Also, it is obvious to those skilled in the art to which the present invention pertains that the aspects and advantages of the present invention can be realized by the means as claimed and combinations thereof.

In accordance with an embodiment of the present invention, a hub bearing includes a hub provided with a disc-shaped wheel coupling portion which is coupled to a wheel and a bearing mounting portion which passes through and protrudes from the wheel coupling portion, first face splines being formed on a protruding surface, and a bearing formed with a lower end fixed to the bearing mounting portion such that one side of the lower end comes into contact with the wheel coupling portion and an upper end fixed to a vehicle body, second face splines being formed on one surface of the lower end.

The hub bearing may further include a drive shaft coupling portion provided with first counter splines which are formed on an outer side of a cap-shaped protrusion portion inserted into the bearing mounting portion such that the first counter splines are fastened with the protrusion portion and the first face splines and second counter splines which are coupled with the second face splines.

The drive shaft coupling portion may be fixed to the hub through a fixing pin which is inserted into the bearing mounting portion from the wheel coupling portion to be coupled with the drive shaft coupling portion.

DESCRIPTION OF SPECIFIC EMBODIMENTS

Figure 1:
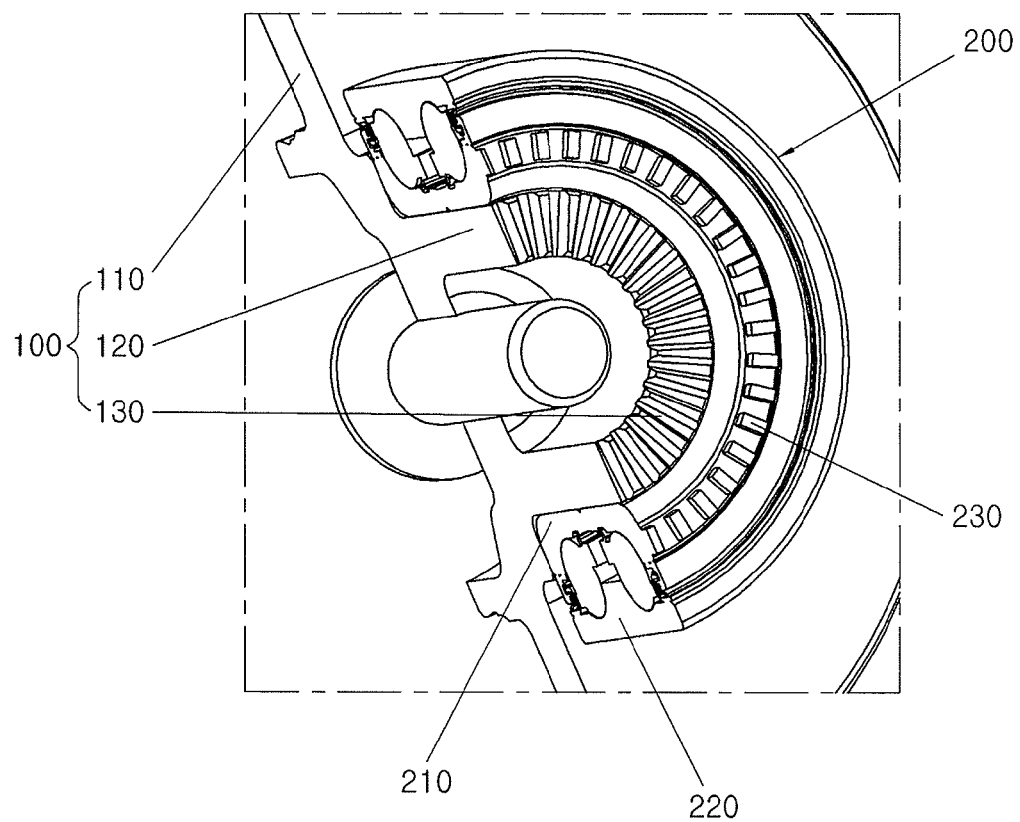
FIG. 1 is a perspective cross-sectional view illustrating a hub bearing according to an embodiment of the present invention.

Embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

In this disclosure, terms "hub bearing" and "hub bearing device" may be interchangeably used throughout the disclosure to describe a device or apparatus that is disposed between a suspension and a wheel. Generally, a hub bearing or hub bearing assembly includes a hub and a bearing fixed to the hub. Splines are provided on a contact portion between a drive shaft and the hub bearing so that rotation of the drive shaft is synchronized with rotation of the hub by engagement of the splines with the contact portion.

The splines may be formed only on the contact portion between the hub and the drive shaft so as to synchronize only the rotation of the hub and the drive shaft.

However, a portion of the bearing fixed to the hub (for example, an inner ring of the bearing) is subordinately rotated depending upon the rotation of the hub, but might not be synchronized with the rotation of the drive shaft. Therefore, the vehicle does not correspond to rapid rotation of the hub when it is rapidly accelerated after stopping, resulting in a slip. Consequently, durability of the hub and the bearing cannot help but be deteriorated. In addition, vehicle quality may be adversely affected by generation of a joint due to the slip.

Figure 2:
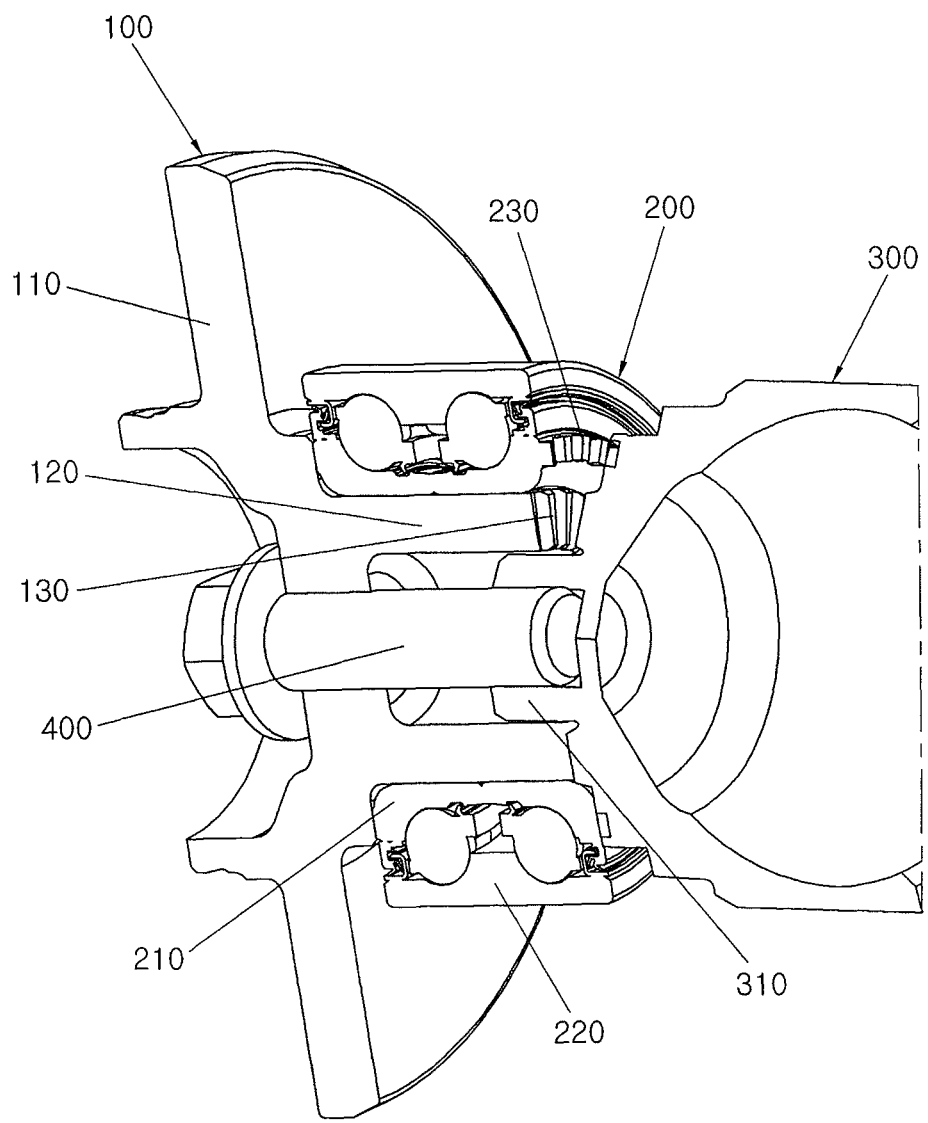
FIG. 2 is a perspective cross-sectional view illustrating a state in which a drive shaft coupling portion is coupled to the hub bearing of FIG. 1.
Figure 3:
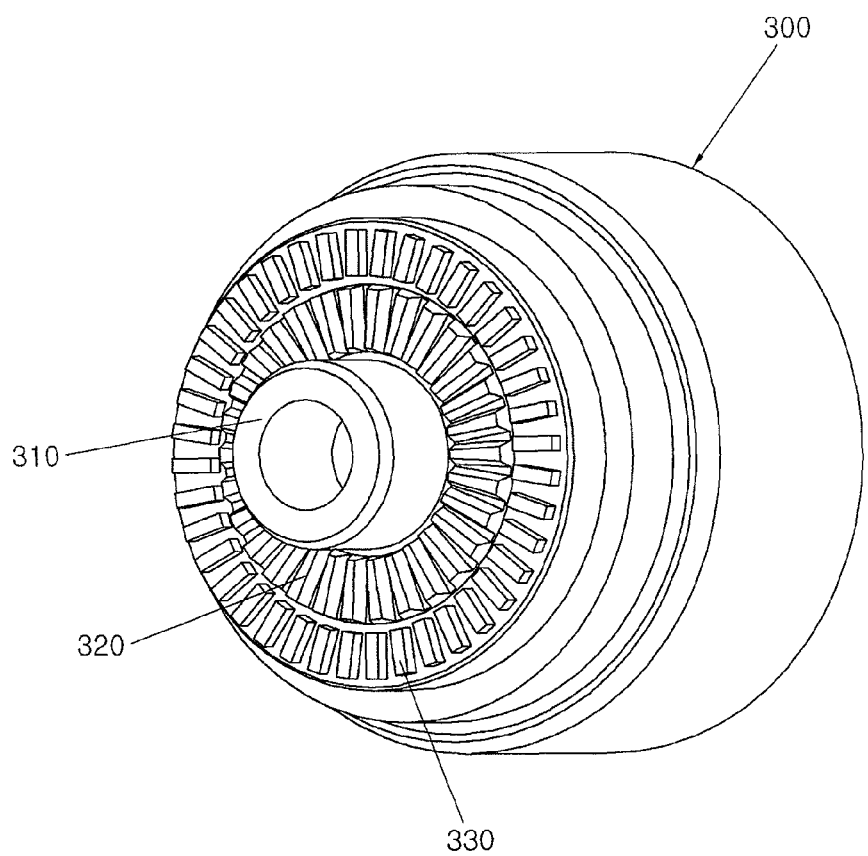
FIG. 3 is a perspective view illustrating the drive shaft coupling portion of FIG. 2.

FIG. 1 is a perspective cross-sectional view illustrating a hub bearing according to an embodiment of the present invention. FIG. 2 is a perspective cross-sectional view illustrating a state in which a drive shaft coupling portion is coupled to the hub bearing of FIG. 1. FIG. 3 is a perspective view illustrating the drive shaft coupling portion of FIG. 2.

As shown in FIG. 1, the hub bearing according to the embodiment of the present invention includes a hub 100 provided with a disc-shaped wheel coupling portion 110 which is coupled to a wheel and a bearing mounting portion or sleeve 120 which passes through and protrudes from the wheel coupling portion 110, first face splines 130 being formed on a protruding surface in the hub 100, and a bearing 200 formed with a lower end 210 fixed to the bearing mounting portion 120 such that one side of the lower end 210 comes into contact with the wheel coupling portion 110 and an upper end 220 fixed to a vehicle body, second face splines 230 being formed on one surface of the lower end 210 in the bearing 200.

A plurality of bolts fastened to the wheel may be mounted to the wheel coupling portion 110. The bearing mounting portion 120 has a length equal to a width of the bearing 200 and has a diameter equal to an inner diameter of the bearing 200.

The bearing 200 is constituted of the upper end 220 and the lower end 210 and a rotary body is provided in the middle therebetween. Oil having viscosity which is not changed in high temperature is preferably applied to the rotary body.

In the embodiment of the present invention, two rims serving as a rotary body are mounted to an inner side of the bearing 200. The respective rims are mounted to the lower end 210 and the upper end 220 such that the rims are inserted into round guides provided at the lower end 210 and the upper end 220 so as to maintain the same interval.

The hub bearing further includes a drive shaft coupling portion 300 provided with first counter splines 320 which are formed on an outer side of a cap-shaped protrusion portion 310 inserted into the bearing mounting portion 120 such that the first counter splines 320 may be fastened with the protrusion portion 310 and the first face splines 130 and second counter splines 330 which may be coupled with the second face splines 230.

An outer side of the drive shaft coupling portion 300 is cut such that the drive shaft coupling portion 300 has a stepped structure to form a plurality of steps. The first face splines 130 are arranged on a first step by equal angles toward the same central axis.

The second face splines 230 are arranged on a second step by equal angles toward the same central axis. The second face splines 230 are arranged at larger intervals compared to the first face splines 130.

The bearing mounting portion 120 is preferably manufactured to have a thickness equal to a length of each of the first face splines 130.

The drive shaft coupling portion 300 is fixed to the hub 100 through a fixing pin 400 which is inserted into the bearing mounting portion 120 from the wheel coupling portion 110 to be coupled with the drive shaft coupling portion 300.

The fixing pin 400 has a hexagonal head formed on one side thereof and a doughnut-shaped washer located beneath the hexagonal head. The fixing pin 400 has a cylinder-shaped body portion which is formed beneath the washer and is formed of a length adding a thickness of the wheel coupling portion 110, a depth of the bearing mounting portion 120, and a depth of the protrusion portion 310.

In accordance with a hub bearing according to the embodiments of the present invention, since face splines are respectively provided on a hub and a bearing so that rotation of a drive shaft is synchronized with rotation of both of the hub and the bearing, it may be possible to prevent a slip between the hub and the bearing even if a vehicle starts quickly after stopping.

In addition, since a joint is not generated by prevention of the slip between the hub and the bearing, vehicle quality may be improved.

In addition, since the drive shaft need not be fitted in the hub, an assembly process may be simplified.

In addition, it may be possible to easily disassemble and assemble components in the event of A/S.

In addition, since the drive shaft has a simplified shape, components to be fitted in the hub may be eliminated.

In addition, since the drive shaft has a simplified shape, it may be possible to reduce an amount of material required to manufacture the drive shaft and thus weight thereof.

In addition, since the amount of material required to manufacture the drive shaft is reduced, it may be possible to save costs.

In addition, since the slip between the hub and the bearing is prevented, it may be possible to reduce an energy loss due to the slip and improve fuel efficiency by the reduction of the energy loss.

While the present invention has been described with respect to the specific embodiments, it will be apparent to those skilled in the art that various changes and modifications may be made without departing from the spirit and scope of the invention as defined in the following claims.

What is claimed is:

1. A hub bearing device comprising:
    a hub comprising:
        a disc-shaped wheel coupling portion coupled to a wheel,
        a bearing mounting sleeve protruding from the wheel coupling portion, and
        first face splines formed on a surface of the bearing mounting sleeve; and
    a bearing comprising:
        an inner ring fixed to the bearing mounting sleeve,
        an outer ring fixed to a vehicle body, and
        second face splines formed on one side surface of the inner ring.

2. The device of claim 1, further comprising a drive shaft coupler comprising:
    first counter splines formed on an outer side thereof and engageable with the first splines, and
    second counter splines formed on the outer side thereof and engageable with the second splines.

3. The device of claim 2, wherein the drive shaft coupler is fixed to the hub through a fastener which passes through the bearing mounting sleeve.

* * * * *